United States Patent
Gan et al.

(10) Patent No.: US 9,133,301 B2
(45) Date of Patent: *Sep. 15, 2015

(54) EPOXY RESIN HARDENER COMPOSITIONS AND EPOXY RESIN COMPOSITIONS CONTAINING SUCH HARDENER COMPOSITIONS

(71) Applicant: Dow Global Technologies LLC, Midland, MI (US)

(72) Inventors: Joseph Gan, Strasbourg (FR); Carola Rosenthal, Buehlertal-Obertal (DE); Matthieu M. Eckert, Achenheim (DE); Bernhard Kainz, Lauf (DE); Emile C. Trottier, Renchen (DE)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/573,643

(22) Filed: Dec. 17, 2014

(65) Prior Publication Data

US 2015/0105523 A1 Apr. 16, 2015

Related U.S. Application Data

(60) Continuation of application No. 13/784,142, filed on Mar. 4, 2013, now Pat. No. 8,927,663, which is a division of application No. 12/812,534, filed as application No. PCT/US2009/030170 on Jan. 6, 2009, now Pat. No. 8,389,652.

(60) Provisional application No. 61/022,955, filed on Jan. 23, 2008.

(51) Int. Cl.
| | |
|---|---|
| *C08G 59/14* | (2006.01) |
| *C08G 65/26* | (2006.01) |
| *C08G 59/18* | (2006.01) |
| *C09D 5/03* | (2006.01) |
| *C08G 59/00* | (2006.01) |
| *C09D 163/00* | (2006.01) |
| *C08G 18/64* | (2006.01) |
| *C08G 59/64* | (2006.01) |
| *C08L 63/00* | (2006.01) |

(52) U.S. Cl.
CPC .......... *C08G 59/1477* (2013.01); *C08G 18/643* (2013.01); *C08G 59/00* (2013.01); *C08G 59/184* (2013.01); *C08G 59/64* (2013.01); *C08L 63/00* (2013.01); *C09D 5/03* (2013.01); *C09D 163/00* (2013.01)

(58) Field of Classification Search
None
See application file for complete search history.

(56) References Cited

U.S. PATENT DOCUMENTS

| | | |
|---|---|---|
| 3,686,359 A | 8/1972 | Soldatos et al. |
| 4,066,628 A | 1/1978 | Ashida et al. |
| 4,113,684 A * | 9/1978 | Petrie ............................. 523/404 |
| 4,310,695 A * | 1/1982 | Dante ........................... 564/445 |
| 4,355,058 A | 10/1982 | Gras et al. |
| 4,360,649 A | 11/1982 | Kamio et al. |
| 4,438,254 A | 3/1984 | Doorakian et al. |
| 4,446,257 A | 5/1984 | Kooijmans et al. |
| 4,480,082 A | 10/1984 | McLean et al. |
| 4,609,685 A | 9/1986 | Cuscurida et al. |
| 4,678,712 A | 7/1987 | Elliott |
| 5,089,588 A | 2/1992 | White et al. |
| 5,115,075 A | 5/1992 | Brennan et al. |
| 5,171,820 A | 12/1992 | Mang et al. |
| 5,246,751 A | 9/1993 | White et al. |
| 6,645,631 B2 | 11/2003 | Gan et al. |
| 7,001,938 B2 | 2/2006 | Watkins et al. |
| 8,389,652 B2 * | 3/2013 | Gan et al. ....................... 525/526 |
| 8,927,663 B2 * | 1/2015 | Gan et al. ....................... 525/526 |
| 2004/0147690 A1 | 7/2004 | Watkins et al. |
| 2006/0089426 A1 | 4/2006 | Haubennestel et al. |

FOREIGN PATENT DOCUMENTS

| | | |
|---|---|---|
| EP | 0368459 | 5/1990 |
| EP | 1650246 | 4/2006 |
| GB | 1103325 | 2/1968 |
| GB | 1326435 | 8/1973 |
| JP | 57-16068 | 1/1982 |
| JP | 57-100127 | 6/1982 |
| JP | 59024762 | 2/1984 |
| JP | 61-500499 | 3/1986 |
| JP | 2105817 | 4/1990 |
| WO | 85/00466 | 10/1985 |
| WO | 2004060956 | 7/2004 |

OTHER PUBLICATIONS

International Preliminary Report on Patentability from related PCT application PCT/US2009/030170 dated Jan. 29, 2010, 8 pages.
H. Lee, K. Neville, The Handbook of Epoxy Resins, Chapters 1, 2, & 3, published by McGraw-Hill, New York, 1967.

* cited by examiner

*Primary Examiner* — Michael J Feely
(74) *Attorney, Agent, or Firm* — Brooks, Cameron & Huebsch, PLLC

(57) ABSTRACT

An epoxy resin hardener composition including a reaction product of (i) a compound having at least one vicinal epoxy group, and (ii) an amino alcohol; an epoxy resin composition including the epoxy resin hardener composition and a compound having at least one vicinal epoxy group; and a powder coating composition including particles of the epoxy resin hardener composition and particles of a compound having at least one vicinal epoxy group.

8 Claims, No Drawings

EPOXY RESIN HARDENER COMPOSITIONS AND EPOXY RESIN COMPOSITIONS CONTAINING SUCH HARDENER COMPOSITIONS

CROSS REFERENCE TO RELATED SUBJECT MATTER

This application is a Continuation application of U.S. patent application Ser. No. 13/784,142, filed Mar. 4, 2013 (now U.S. Pat. No. 8,927,663), which is a Divisional application of U.S. patent application Ser. No. 12/812,534, having 371(c) date of Aug. 19, 2010 (now U.S. Pat. No. 8,389,652), which is a National Stage Application of PCT/US2009/030170, filed Jan. 6, 2009, and published as WO2009/094235 on Jul. 30, 2009, which claims the benefit of U.S. Provisional Application Ser. No. 61/022,955, filed Jan. 23, 2008, the entire contents of which are incorporated herein by reference.

BACKGROUND OF THE INVENTION

The instant invention is in the field of epoxy resin compositions. More specifically, the instant invention relates to compositions for hardening or curing epoxy resins, and especially, epoxy resins useful in powder coating applications.

Due to their physical and chemical properties such as high resistance to chemical attack and good adhesion to various substrates, epoxy resins are useful in the preparation of coatings. The epoxy resins can be applied, for example, from organic or aqueous solutions onto a variety of different substrates or applied in a powder form to be cured into a film coating by heating.

Conventionally, in preparing a powder coating using an epoxy resin, particles of a solid epoxy resin are blended with particles of a hardener such as a compound containing one or more reactive phenolic hydroxyl groups or one or more amine groups, which diffuse with and react with the epoxide groups of the epoxy resin to form a hard thermoset coating. For example, an epoxy powder coating has been prepared in situ on a suitable substrate by applying a mixture of particles of solid epoxy resin with particles of a solid epoxy hardener composition having more than one phenolic hydroxyl groups and a suitable accelerant or catalyst to a substrate and subsequently heating the coated substrate to effect the reaction between the epoxy containing component and the phenolic hydroxyl containing component. If desired, the mixture can also contain dyes, pigments and flow control agents.

Although the adhesion of the coating prepared from the above-described epoxy resin compositions to a substrate is generally sufficient, the adhesion of the cured epoxy resin coating to various metal substrates such as a mild steel substrate when the coated substrate is subjected to humid conditions has been improved by the use of various chemical modifications to the epoxy resin compositions as disclosed in Japanese Patent Applications Kokai Nos S59-24762 and H2-105817; U.S. Pat. No. 4,678,712; U.S. Pat. No. 7,001,938; and U.S. Patent Application 2004/0147690. Despite the above-mentioned advancements in the art, there remains a need to further improve the adhesion and processing economics of the cured epoxy resin coating to various metal substrates such as a mild steel substrate when the coated substrate is subjected to humid conditions.

SUMMARY OF THE INVENTION

The instant invention provides a solution to the above-stated problem. Use of an epoxy resin hardener composition of the instant invention provides improved adhesion of a cured epoxy resin coating to, for example, a steel substrate. The epoxy resin hardener composition of the instant invention can also be used at a relatively low temperature.

More specifically, the instant invention is a hardener composition comprising a reaction product of (i) a compound having at least one vicinal epoxy group and (ii) an amino alcohol.

In a related embodiment, the instant invention is an epoxy resin composition comprising (a) a reaction product of a compound having at least one vicinal epoxy group and an amino alcohol; and (b) a compound having at least one vicinal epoxy group.

And, in another related embodiment, the instant invention is an epoxy resin powder coating composition comprising particles of a reaction product of (a) a compound having at least one vicinal epoxy group and an amino alcohol; and (b) particles of a compound having at least one vicinal epoxy group.

In yet another related embodiment, the instant invention is an isocyanate resin solvent-free composition comprising (a) the reaction product of a compound having at least one vicinal epoxy group and an amino alcohol; and (b) a compound having at least one vicinal isocyanate group.

DETAILED DESCRIPTION OF THE PREFERRED EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show embodiments of the present invention in more detail than is necessary for the fundamental understanding of the present invention, the description making apparent to those skilled in the art how the several forms of the present invention may be embodied in practice.

In one embodiment, the instant invention is a composition useful as an epoxy resin hardener comprising a reaction product of (i) a compound having at least one vicinal epoxy group; and (ii) an amino alcohol.

Epoxy Resin Hardener Composition

Component (i) of the epoxy resin hardener composition can be any well-known epoxy resin. The term "epoxy resin" herein means a composition which possesses one or more vicinal epoxy groups per molecule, i.e. at least one 1,2-epoxy group per molecule. In general, the epoxy resin compound may be a saturated or unsaturated aliphatic, cycloaliphatic, aromatic or heterocyclic compound which possesses at least one 1,2-epoxy group. Such compound can be substituted, if desired, with one or more non-interfering substituents, such as halogen atoms, hydroxy groups, ether radicals, lower alkyls and the like.

The epoxy resins useful in the present invention may include monoepoxides, diepoxides, polyepoxides or mixtures thereof. Illustrative compounds useful in the practice of the instant invention are described in the *Handbook of Epoxy Resins* by H. E. Lee and K. Neville published in 1967 by McGraw-Hill, New York; and U.S. Pat. No. 4,066,628, both of which are incorporated herein by reference.

The compound having at least one vicinal epoxy group may comprise a compound having two vicinal epoxy groups. For example, particularly useful compounds which can be used in the practice of the present invention are epoxy resins having the following formula:

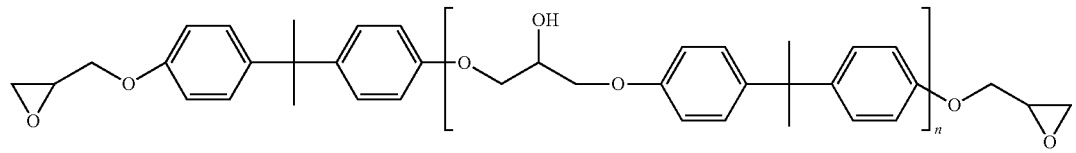

wherein n has an average value of generally 0 or more, preferably from 0 to about 100, and more preferably from about 0.1 to about 50.

The epoxy resins useful in the present invention may include, for example, the glycidyl polyethers of polyhydric phenols and polyhydric alcohols. As an illustration of the present invention, examples of known epoxy resins that may be used in the present invention, include for example, the diglycidyl ethers of resorcinol, catechol, hydroquinone, bisphenol, bisphenol A, bisphenol AP (1,1-bis(4-hydroxylphenyl)-1-phenyl ethane), bisphenol F, bisphenol K, tetrabromobisphenol A, phenol-formaldehyde novolac resins, alkyl substituted phenol-formaldehyde resins, phenol-hydroxybenzaldehyde resins, cresol-hydroxybenzaldehyde resins, dicyclopentadiene-phenol resins, dicyclopentadiene-substituted phenol resins tetramethylbiphenol, tetramethyl-tetrabromobiphenol, tetramethyltribromobiphenol, tetrachlorobisphenol A; and any combination thereof.

Examples of diepoxides particularly useful in the present invention include diglycidyl ether of 2,2-bis(4-hydroxyphenyl) propane (generally referred to as bisphenol A) and diglycidyl ether of 2,2-bis(3,5-dibromo-4-hydroxyphenyl) propane (generally referred to as tetrabromobisphenol A). Mixtures of any two or more diepoxides can also be used in the practice of the present invention.

Other diepoxides which can be employed in the practice of the present invention include the diglycidyl ethers of dihydric phenols, such as those described in U.S. Pat. Nos. 5,246,751; 5,115,075; 5,089,588; 4,480,082 and 4,438,254, all of which are incorporated herein by reference; or the diglycidyl esters of dicarboxylic acids such as those described in U.S. Pat. No. 5,171,820, incorporated herein by reference. Other suitable diepoxides include for example, αω-diglycidyloxyisopropy-lidene-bisphenol-based epoxy resins such as those commercially known as D.E.R.® 300 and 600 series epoxy resins, which are available products from The Dow Chemical Company.

The epoxy resins which can be employed in the practice of the present invention also include epoxy resins prepared either by reaction of diglycidyl ethers of dihydric phenols with dihydric phenols or by reaction of dihydric phenols with epichlorohydrin (also known as "taffy resins").

Preferred epoxy resins useful in the present invention include, for example, the diglycidyl ethers of bisphenol A; 4,4'-sulfonyldiphenol; 4,4-oxydiphenol; 4,4'-dihydroxyben-zophenone; resorcinol; hydroquinone; 9,9'-bis(4-hydrox-yphenyl)fluorene; 4,4'-dihydroxybiphenyl or 4,4'-dihydroxy-α-methylstilbene and the diglycidyl esters of the dicarboxylic acids mentioned previously.

Other useful epoxide compounds which can be used in the practice of the present invention are cycloaliphatic epoxides. A cycloaliphatic epoxide consists of a saturated carbon ring having an epoxy oxygen bonded to two vicinal atoms in the carbon ring for example as illustrated by the following general formula:

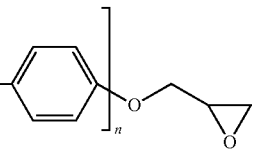

wherein R is a hydrocarbon group optionally comprising one or more heteroatoms (such as, without limitation thereto Cl, Br, and S), or an atom or group of atoms forming a stable bond with carbon (such as, without limitation thereto, Si, P and B) and wherein n is greater than or equal to 1.

The cycloaliphatic epoxide may be a monoepoxide, a diepoxide, a polyepoxide, or a mixture of those. For example, any of the cycloaliphatic epoxide described in U.S. Pat. No. 3,686,359, incorporated herein by reference, may be used in the present invention. As an illustration, the cycloaliphatic epoxides that may be used in the present invention include, for example, (3,4-epoxycyclohexyl-methyl)-3,4-epoxy-cy-clohexane carboxylate, bis-(3,4-epoxycyclohexyl) adipate, vinylcyclohexene monoxide and mixtures thereof.

Component (ii) of the epoxy resin hardener composition can be any well-known aminoalchohol. Generally, the aminoalcohol useful in the present invention contains amine groups that are preferably primary amine groups. However, aminoalcohols containing secondary amines groups are also useful in the present invention. The amino alcohol is preferably an amino polyol.

For example, the aminoalcohol useful in the present invention may be selected from the group consisting of monoethanolamine; 2-amino-2-hydroxymethyl-1,3-propanediol; 2-amino-2-methyl-1,3-propanediol; diethanolamine and mixtures thereof. Preferably, 2-amino-2-hydroxymethyl-1,3-propanediol is used in the present invention.

The hardener resin composition of the present invention, in general, contains an amount of component (i) and component (ii) wherein the mole ratio of the amine groups of the amino alcohol to the epoxy groups of the epoxy resin compound having at least one vicinal epoxy group is in the range of from about 25:1 to about 1:1, preferably from about 10:1 to about 1:1, more preferably from about 5:1 to about 1:1, even more preferably from about 3:1 to about 1:1, and most preferably from about 2:1 to about 1:1.

The resulting resin hardener composition of present invention advantageously has a softening point of from about 30° C. to about 150° C. which allows the composition to be used with various compounds and in various applications.

For example, the resin hardener composition of the present invention may be useful as an hardener for one or more of the compounds selected from epoxy-, isocyanate-, carboxylic acid-, vinyl- and acrylic-functional resins.

In one embodiment of the present invention, the resin hardener composition of the present invention comprises a composition which is free of residual bisphenol A; induces no foaming; and contains less volatiles when a high molecular weight alkanolamine is used in the composition. For example, the molecular weight of the high molecular weight alkanolamine may be from about 150 Da to about 10,000 Da.

In another embodiment the resin hardener composition of the present invention comprises a composition which is dispersible in water. The composition which is dispersible in water may also be useful to emulsify epoxy resins without the use of a solvent.

The resin hardener composition of the present invention may be used in various applications including for example, coating applications, adhesives application or composites applications. In one particular embodiment the resin hardener may be used for a heat-cured epoxy coating.

In yet another embodiment, the resin hardener composition of the present invention may be used as a cross-linker for an epoxy resin; wherein the epoxy resin is a high molecular epoxy resin having a molecular weight of from about 300 Da to about 10,000 Da; wherein the resin hardener composition may be formulated in the absence of a solvent and a dispersion; and wherein the resin hardener composition may be formaldehyde-free.

Epoxy Resin Composition

In general, a typical epoxy resin composition comprises one or more epoxy resins and an epoxy resin hardener. The epoxy resin hardener reacts with the epoxy resin, often at an elevated temperature, to produce a cured epoxy resin. Prior art epoxy resin hardeners include, for example, aliphatic and aromatic amine based hardeners and phenolic based hardeners. Epoxy resin compositions also frequently contain a catalyst or an "accelerator", such as 2-methylimidazole, to increase the rate of reaction between the epoxy resin composition and the epoxy resin hardener at any given temperature.

An embodiment of the present invention includes a thermosettable epoxy resin composition comprising (a) an epoxy resin hardener comprising a reaction product of (i) a compound having at least one vicinal epoxy group, and (ii) an amino alcohol; and (b) a compound having at least one vicinal epoxy group.

The reaction product, component (a) of the epoxy resin composition, may be the epoxy resin hardener composition described above comprising a reaction product of (i) a compound having at least one vicinal epoxy group, and (ii) an amino alcohol.

Component (i), a compound having at least one vicinal epoxy group, useful for preparing component (a) of the epoxy resin composition, may include any of the epoxy resins described above with reference to the epoxy resin hardener composition.

Component (ii), an amino alcohol, useful for preparing component (a) of the epoxy resin composition, may include any of the amino alcohols previously described above with reference to the epoxy resin hardener composition.

Component (b), a compound having at least one vicinal epoxy group which can be used for preparing the epoxy resin composition, may include any one or more of the epoxy resins described above with reference to the epoxy resin hardener composition. The epoxy component (b) may be the same, or different from, the epoxy resin component (i).

The epoxy resin composition of the present invention may contain optional components such as for example a co-curing agent (co-hardener) well known to those skilled in the art, in addition to, and different from, the epoxy resin hardener composition of the present invention. Co-curing agents useful in the present invention are those compounds known to the skilled in the art to react with epoxy resins to form cured final products. In one embodiment, the epoxy resin composition of the present invention further comprises a co-curing agent.

Examples of co-curing agents useful in the present invention include, for example, amino compounds such as dicyandiamide, DDS, DMA, phenolic hardeners such as phenol novolacs, bisphenol-A novolacs, cresol novolacs, and two functional phenolic hardeners such as D.E.H. 85, D.EH. 87 and D.E.H. 90.

In one embodiment, the co-curing agent, utilized in the composition of the present invention includes at least one hardener compound with at least one phenolic hydroxyl functionality, a hardener compound capable of generating at least one phenolic hydroxyl functionality, or mixtures thereof. Preferably, the co-curing agent is a compound or a mixture of compounds with a phenolic hydroxyl functionality.

Examples of compounds with a phenolic hydroxyl functionality (the phenolic co-curing agent) include compounds having an average of one or more phenolic groups per molecule. Suitable phenol co-curing agents include dihydroxy phenols, biphenols, bisphenols, halogenated biphenols, halogenated bisphenols, alkylated biphenols, alkylated bisphenols, trisphenols, phenol-aldehyde resins, phenol-aldehyde novolac resins, halogenated phenol-aldehyde novolac resins, substituted phenol-aldehyde novolac resins, phenol-hydrocarbon resins, substituted phenol-hydrocarbon resins, phenol-hydroxybenzaldehyde resins, alkylated phenol-hydroxybenzaldehyde resins, hydrocarbon-phenol resins, hydrocarbon-halogenated phenol resins, hydrocarbon-alkylated phenol resins, or combinations thereof. Preferably, the phenolic co-curing agent includes substituted or unsubstituted phenols, biphenols, bisphenols, novolacs or combinations thereof.

The co-curing agent of the present invention may be selected from, for example, phenol novolac, bisphenol A novolac, bisphenol A, tetrabromobisphenol A and mixtures thereof.

The co-curing agent may also include any of the multifunctional phenolic cross-linkers described in U.S. Pat. No. 6,645,631 Column 4, lines 57-67 to Column 6 lines 1-57, incorporated herein by reference.

Examples of co-curing agents capable of generating phenolic hydroxyl functionalities are monomeric and oligomeric benzoxazines and polybenzoxazines, and the like. By "generating" herein it is meant that upon heating the co-curing agent compound, the co-curing agent compound transforms into another compound having phenolic hydroxyl functionalities, which acts as a co-curing agent; wherein the hydroxyl functionalities can further reaction with the epoxy resin similar to the phenolic co-curing agents defined above. Examples of the co-curing agents may also include compounds which form a phenolic cross-linking agent upon heating, such as for example, species obtained from heating bezoxazines as described in U.S. Pat. No. 6,645,631, incorporated herein by reference. Examples of such components also include benzoxazine of phenolphthalein, benzoxazine of bisphenol-A, benzoxazine of bisphenol-F, benzoxazine of phenol novolac and the like. Mixtures of such compounds described above may also be used.

In another embodiment, one or several co-curing agents that do not contain phenolic hydroxyl functionality or capable of generating phenolic hydroxyl functionality may be present in the epoxy resin composition of the present invention. Such co-curing agents include, but are not limited to, for example, amino-containing compounds, such as amines and dicyandiamide, and carboxylic acids and carboxylic anhydrides, such as styrene-maleic anhydride polymer; and mixtures thereof.

Preferably, the molar ratio of the hardener composition of the present invention to the co-curing agent (the molar ratio is calculated based on the active groups capable of reacting with epoxides) is between about 100% and about 50% preferably between about 50% and about 0.1%, more preferably between about 20% and about 0.5%, and even more preferably between about 100% and about 0%. Preferably, the weight ratio of the hardener composition of the present invention to co-curing agent is between about 100% and about 50%, more preferably between about 50% and about 1%, even more preferably between about 20% and about 1%, and most preferably between about 100% and 0%.

The ratio of the hardener composition of the present invention to epoxy resin is preferably suitable to provide a fully cured resin. The amount of the hardener composition of the present invention which may be present may vary. In one embodiment, the molar ratio between the epoxy groups of the epoxy resin Component (b) and the reactive hydrogen groups of the hardener composition of the present invention Component (a) is between about 2 and about 0.5, preferably between about 1.5 and about 1, and more preferably between about 1.3 and about 1. If a co-curing agent is used in combination with the hardener composition of the present invention, then the molar ratios described above should be based on the combination of the hardener composition and co-curing agent.

Accelerators, also referred to as catalysts, may optionally be utilized in the epoxy resin composition of the present invention. Accelerators include those compounds which catalyze the reaction of the epoxy resin with the hardener composition of the present invention (and/or the co-curing agent when present). In one embodiment, the epoxy resin composition of the present invention further comprises an accelerator.

For example, accelerators useful in the present invention include compounds containing amine, phosphine, heterocyclic nitrogen, ammonium, phosphonium, arsonium or sulfonium moieties; and mixtures thereof. More preferably, the accelerators can be heterocyclic nitrogen and amine-containing compounds and even more preferably, the accelerators are heterocyclic nitrogen-containing compounds. Heterocyclic nitrogen-containing compounds useful as accelerators include heterocyclic secondary and tertiary amines or nitrogen-containing compounds such as, for example, imidazoles, imidazolidines, imidazolines, bicyclic amidines, oxazoles, thiazoles, pyridines, pyrazines, morpholines, pyridazines, pyrimidines, pyrrolidines, pyrazoles, quinoxalines, quinazolines, phthalazines, quinolines, purines, indazoles, indazolines, phenazines, phenarsazines, phenothiazines, pyrrolines, indolines, piperidines, piperazines, as well as quaternary ammonium, phosphonium, arsonium or stibonium, tertiary sulfonium, secondary iodonium, and other related "onium" salts or bases, tertiary phosphines, amine oxides, and combinations thereof. Imidazoles as utilized herein include imidazole, 1-methylimidazole, 2-methylimidazole, 4-methylimidazole, 2-ethylimidazole, 2-ethyl-4-methylimidazole, 2-phenylimidazole, 2-undecylimidazole, 1-benzyl-2-methylimidazole, 2-heptadecyl imidazole, 4,5-diphenylimidazole, 2-isopropylimidazole, 2,4-dimethyl imidazole, 2-phenyl-4-methylimidazole, 1-cyanoethyl-2-ethyl-4-methylimidazole and the like; and mixtures thereof. Preferred imidazoles include 2-methylimidazole, 2-phenylimidazole and 2-ethyl-4-methylimidazole; and mixtures thereof.

Among preferred tertiary amines that may be used as accelerators are those mono- or polyamines having an open chain or cyclic structure which have all of the amine hydrogen replaced by suitable substituents, such as hydrocarbon radicals, and preferably aliphatic, cycloaliphatic or aromatic radicals. Examples of these amines include, among others, methyl diethanolamine, triethylamine, tributylamine, benzyldimethylamine, tricyclohexyl amine, pyridine, quinoline, and the like; and mixtures thereof. Preferred amines are the trialkyl and tricycloalkyl amines, such as triethylamine, tri(2,3-dimethylcyclohexyl)amine, and the alkyl dialkanol amines, such as methyl diethanolamine and the trialkanolamines such as triethanolamine. Weak tertiary amines, e.g., amines that in aqueous solutions give a pH less than 10, are particularly preferred. Especially preferred tertiary amine accelerators are benzyldimethylamine and tris-(dimethylaminomethyl) phenol.

Imidazolines as utilized herein include 2-methyl-2-imidazoline, 2-phenyl-2-imidazoline, 2-undecylimidazoline, 2-heptadecylimidazoline, 2-isopropylimidazole, 2,4-dimethyl imidazoline, 2-phenyl-4-methylimidazol-ine, 2-ethylimidazoline, 2-isopropylimidazoline, 4,4-dimethyl-2-imidazolin-e, 2-benzyl-2-imidazoline, 2-phenyl-4-methylimidazoline and the like; and mixtures thereof.

Optionally, the curable epoxy resin composition of the present invention may further contain other components typically used in an epoxy resin compositions, particularly for making powder coatings; and which do not detrimentally affect the properties or performance of the curable epoxy resin composition of the present invention, or the final cured product therefrom. For example, other optional components useful in the epoxy resin composition may include, but not limited to, toughening agents; curing inhibitors; other reaction accelerators, fillers; wetting agents; colorants; flame retardants such as antimony oxide, octabromodiphenyl oxide, decabromodiphenyl oxide, phosphoric acid; solvents; thermoplastics; processing aids; fluorescent compound; such as tetraphenolethane (TPE) or derivatives thereof; UV blocking compounds; dyes; pigments; surfactants; flow modifier; flow control agents; viscosity controller; plasticizers; other optional additives commonly employed as additives for epoxy resin compositions as is known in the art; and mixtures thereof.

The other optional components used in the epoxy resin composition of the present invention may be used in an effective amount to provide the intended property to the epoxy resin composition. For example, the optional components may be generally employed in an amount of from about 0.05 wt % to about 40 wt %.

The curable epoxy resin composition of present invention may be used in various applications including for example, coatings, adhesives and composites. In one embodiment, the epoxy resin composition may contain an alkanolamine in the polymer chain modifiable with acrylic acids; and wherein the composition may be useful for UV cure applications.

The curable or hardenable epoxy resin composition of the present invention disclosed herein, which may be useful as a coating composition, may be prepared by admixing the components aforementioned above including, for example, at least one epoxy resin and at least one epoxy resin hardener composition of the present invention and optionally a co-curing agent.

The curable epoxy resin composition may be prepared by admixing all of the components of the composition together in any order. Alternatively, the curable epoxy resin composition of the present invention can be produced by preparing a first composition comprising the epoxy resin component and a second composition comprising the hardener composition component. All other components useful in making the epoxy resin composition may be present in the same composition, or some may be present in the first composition, and some in the second composition. The first composition is then mixed with the second composition to form the curable epoxy resin composition. The epoxy resin composition mixture is then cured to produce an epoxy resin thermoset material. Preferably, the curable epoxy resin composition is in the form of a powder particles wherein the components of the composition are applied to a substrate to produce a coated article.

Powder Coating Composition

In another related embodiment of the present invention, the instant invention is an epoxy resin powder coating composition comprising (a) particles of a reaction product of (i) a compound having at least one vicinal epoxy group and (ii) an amino alcohol; and (b) particles of a compound having at least one vicinal epoxy group.

The epoxy resin hardener composition (curing agent) of the present invention may be utilized with an epoxy resin to form a curable powder coating composition which may optionally include adjuncts known in the art such as pigments, fillers, dyes and flow control agents. In one embodiment, the powder coating composition of the present invention comprises one or more of a pigment, a filler, a dye or a flow control agent.

The powder coating composition of the present invention may be prepared by any process which blends the components of the composition substantially uniformly. For example, dry blend, semi-dry blend or melt blend procedures may be used. The blend can then be pulverized to form the powder coating composition. Particles of the powder coating composition will preferably have a size of not more than about 300 microns.

The epoxy resin powder coating composition, which includes the hardener composition of the present invention, may be applied to a substrate by any desired powder coatings process application method known in the art. Examples of application methods for applying the powder coating composition of the present invention to a substrate include fluidized bed sintering (FBS), electrostatic powder coating (EPC) and electrostatic fluidized bed (EFB) applications.

In the fluidized bed sintering (FBS) process a preheated substrate, such as for example a metal pipe, is immersed into the powder coating composition, which is kept suspended by a flow of air. The substrate to be coated is preheated to a temperature, for example in one embodiment of at least about 200° C., and in another embodiment of at least about 240° C., but generally not higher than to about 350° C. in one embodiment, and in another embodiment, not higher than about 300° C. The preheated substrate may then be contacted with the fluidized bed (for example, immersed therein). The immersion time of the substrate depends, inter alia, on the desired coating thickness.

In the electrostatic powder coating (EPC) process, the powder coating composition is blown by compressed air into an applicator where it is usually charged with a voltage of about 30 to 100 kV by a high-voltage direct current, and sprayed onto the surface of the substrate to be coated. Then the coated substrate is baked in a suitable oven. The powder adheres to the cold substrate due to its charge. Alternatively, the electrostatically charged powder can be sprayed onto a heated substrate such as a pipe and allowed to cure with the residual heat of the substrate or with the help of external heat.

In the electrostatic fluidized bed (EFB) process, the above procedures are combined by mounting annular or partially annular electrodes over a fluidized bed containing the powder so as to produce an electrostatic charge of, for example, 50 to 100 kV. Substrates are heated at temperatures specific for the powder coating to fully cure.

The coating processes above are used to ensure that each powder particle comprises all of the components that are necessary to obtain a complete cure and attain the stated performance properties.

Numerous substrates can be coated with the powder coating composition of the present invention. The preferred substrates are metals (for example, iron, steel, copper), in particular metal pipes. Examples of other materials that may be coated with the powder coating composition of the present invention include ceramic and glass materials. The coating made from the powder coating composition of the present invention may find use, for example, as coating material for pipelines operating at high service temperatures (for example, about 110° C. and higher).

The sintered and non-sintered resins as well as the coating composition of the present invention can be also used to electrically insulate coils, transformers, and motors by coating the armatures and stators. The coating composition may also be used to coat magnet wire, bus bars, and torpid cores. Among other things, the above coating composition may be used by manufacturers of appliance fractional horsepower motors and other applications requiring UL Electrical Insulation Systems recognition. In addition, properly formulated, the thermosettable epoxy resin compositions of the present invention can also be used in electrical laminate applications.

In order to provide a better understanding of the present invention including representative advantages thereof, the following examples are offered. It should be understood that the following examples are for illustrative purposes and should not be regarded as limiting the scope of the present invention to any specific materials or conditions.

Example 1

To 101.4 g of 2-amino-2-hydroxymethyl-1,3-propanediol (THMAM) in a reactor is slowly added 40 g of commercially available diglycidyl ether of bisphenol A (DER 330 brand epoxy resin from The Dow Chemical Company) with a dropping funnel to obtain slurry that is brought to reaction by heating up to 168° C. To the resulting stirred homogeneous mixture is added 60 g of DER 330 brand epoxy resin over a period of 30 minutes during which time the reactor's temperature is maintained between 160° C. (set temperature) and 177° C. (by reaction exotherm) followed by stirring for an additional 30 minutes at a temperature of 160° C. to ensure more complete reaction. The glass transition point for the resulting product is 37° C. The melt viscosity at 150° C. of the product is 2.1 Pa·s. The softening point of the product is 81° C.

Example 2

To 324.5 g of 2-amino-2-hydroxymethyl-1,3-propanediol (THMAM) in a reactor at a temperature of 172° C. is slowly added 480 g of a commercially available diglycidyl ether of bisphenol A (DER 330 brand epoxy resin from The Dow Chemical Company) with a dropping funnel during which time the reactor's temperature is maintained between 153° C. and 172° C. followed by stirring for an additional 30 minutes at a temperature of 150° C. to ensure more complete reaction. The glass transition point for the resulting product is 56° C. The melt viscosity at 150° C. of the product is 2.7 Pa·s. The softening point of the product is 96° C. No unreacted epoxy groups are observed by $^{13}$C NMR. The approximate mass distribution by $^{13}$C NMR is BAB 84 mole %; B 10 mole %; BABAB 6 mole %; wherein A is DER 330 and B is THMAM.

Example 3

To 167.3 g of 2-amino-2-hydroxymethyl-1,3-propanediol (THMAM) in a reactor at a temperature of 175° C. is slowly added 333 g of a commercially available diglycidyl ether of bisphenol A (DER 330 brand epoxy resin from The Dow Chemical Company) with a dropping funnel during which time the reactor's temperature is maintained between 156° C. and 178° C. followed by stirring for an additional 60 minutes at a temperature of 175° C. to ensure more complete reaction. The glass transition point for the resulting product is 78° C. The melt viscosity at 150° C. of the product is 131 Pa·s. The softening point of the product is 134° C.

Example 4

To 145 g of 2-amino-2-hydroxymethyl-1,3-propanediol (THMAM) in a reactor at a temperature of 172° C. is slowly added first 18.5 g of a liquid epoxy resin based on polyglycol diglycidyl ether and then 204.5 g of a commercially available diglycidyl ether of bisphenol A (DER 330 brand epoxy resin from The Dow Chemical Company) with a dropping funnel during which time the reactor's temperature is maintained between 168° C. and 182° C. followed by stirring for an additional 30 minutes at a temperature of 175° C. to ensure more complete reaction. The glass transition point for the resulting product is 40° C. The melt viscosity at 150° C. of the product is 2.4 Pa·s. The softening point of the product is 91° C.

Example 5

To 142 g of 2-amino-2-hydroxymethyl-1,3-propanediol (THMAM) in a reactor at a temperature of 165° C. is slowly added first 23 g of a liquid epoxy resin based on polyglycol diglycidyl ether and then 200 g of a commercially available diglycidyl ether of bisphenol A (DER 330 brand epoxy resin from The Dow Chemical Company) with a dropping funnel during which time the reactor's temperature is maintained between 160° C. and 181° C. followed by stirring for an additional 30 minutes at a temperature of 170° C. to ensure more complete reaction. The glass transition point for the resulting product is 49° C. The melt viscosity at 150° C. of the product is 4.0 Pa·s. The softening point of the product is 98° C.

Examples 6 and 7 and Comparative Example A

Three powder coating compositions are prepared by blending the component powders shown in Table I below.

TABLE I

| Component in Powder Coating Composition | Comparative Example A wt % | Example 6 wt % | Example 7 wt % |
| --- | --- | --- | --- |
| Epoxy Resin A[1] | 11.8 | 11.0 | 12.0 |
| Epoxy Resin B[2] | 17.7 | 16.4 | 18.0 |
| Epoxy Resin C[3] | 29.5 | 27.4 | 30.1 |
| Prior Art Epoxy Resin Hardener[4] | 14.5 | — | — |
| Product of Example 2 | — | 15.8 | 10.4 |
| Accelerator[5] | — | 3.46 | 3.46 |
| 2-Methylimidazole | 1.5 | — | — |
| Flow Modifier[6] | — | 1 | 1 |
| BaSO4 Powder | 20 | 20 | 20 |
| TiO2 Powder | 5 | 5 | 5 |

TABLE I-continued

| Component in Powder Coating Composition | Comparative Example A wt % | Example 6 wt % | Example 7 wt % |
| --- | --- | --- | --- |
| Total Wt % Components | 100.0 | 100.0 | 100.0 |
| E/XH Ratio[7] | 1.4 | 1.4 | 1.4 |

Notes for Table I:
[1]Epoxy Resin A is a solid modified bisphenol A epoxy resin containing 10 wt % novolac multifunctional epoxy resin commercially available from The Dow Chemical Company and sold under the trademark DER 6615.
[2]Epxoy Resin B is a bisphenol A based solid epoxy resin commercially available from The Dow Chemical Company and sold under the trademark DER 664UE.
[3]Epoxy Resin C is a solid modified bisphenol A epoxy resin containing 18.7 wt % Novolac multifunctional epoxy resin commercially available from The Dow Chemical Company and sold under the trademark DER 642-U20.
[4]Prior Art Epoxy Resin Hardener is a phenolic epoxy resin hardener commercially available from The Dow Chemical Company and sold under the trademark DEH 85.
[5]Accelerator is a 2-methylimidazole based accelerator commercially available from Hexion Specialty Chemicals Company and sold under the trademark Epon P101.
[6]Flow Modifier is a surface tension modifier commercially available from Cytec and sold under the trademark MODAFLOW.
[7]E/HX Ratio is the ratio of the equivalents of epoxy groups over the sum of equivalents of aminohydrogen groups and phenol groups in the uncured formulation.

The powder coating compositions described in Table I above are applied to grit blasted steel panels and cured at 170° C. for 3 minutes. The applied coatings have a thickness of about 0.35 millimeters. The coatings are subjected to a hot water coating adhesion test and a cathodic disbondment test (CAN/CAS-Z245.20-M92). The results of the tests are shown in Table II below.

TABLE II

| Test and Properties | | | | |
| --- | --- | --- | --- | --- |
| Hot Water Coating Adhesion Test (at 75° C., for 48 hours) | Rating % removed | 5 100% | 1 5-10% | 1 5-10% |
| Cathodic Disbondment Test (28 days, 40 mm cell) | mm removed (in diameter) | 28 mm | 5 mm | 4-6 mm |

It should be readily apparent that although the present invention has been described above in relation with its preferred embodiments, it should be understood by those of ordinary skill in the art that the present invention is not limited thereby but is intended to cover all alternatives, modifications and equivalents that are included within the scope of the present invention as defined by the following claims.

What is claimed is:

1. A solid amino functional hardener composition comprising a reaction product of:
   (i) a compound having at least one vicinal epoxy group; and
   (ii) an amino alcohol having at least one amino group and at least one alcohol group, where the at least one amino group of the amino alcohol are primary amino groups and a mole ratio of amine groups of the amino alcohol is in excess of the epoxy groups of the compound having at least one vicinal epoxy group in the range of from 25:1 to 3:1.

2. The solid amino functional hardener composition of claim 1, wherein the amino alcohol is an amino polyol.

3. The solid amino functional hardener composition of claim 1, wherein the amino alcohol is selected from the group consisting of monoethanolamine, 2-amino-2-hydroxymethyl-1,3-propanediol and 2-amino-2-methyl-1,3-propanediol.

4. The solid amino functional hardener composition of claim 1, wherein the compound having at least one vicinal epoxy group comprises a compound having two vicinal epoxy groups.

5. The solid amino functional hardener composition of claim 1, wherein the compound having at least one vicinal epoxy group comprises a compound having the following formula:

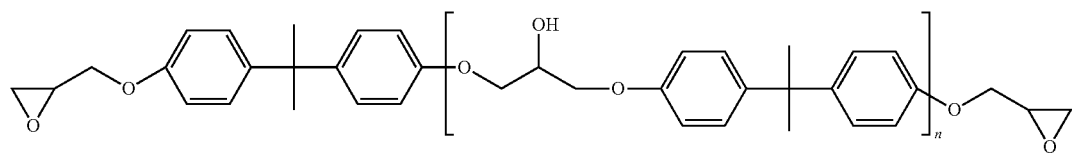

wherein n is 0 or more.

6. The solid amino functional hardener composition of claim 1 useful as a hardener for one or more of the compounds selected from epoxy-, isocyanate-, carboxylic acid-, vinyl- and acrylic-functional resins.

7. The solid amino functional hardener composition of claim 1, wherein the composition is dispersible in water.

8. The solid amino functional hardener composition of claim 1, wherein the composition has a softening point of from about 30° C. to about 150° C.

* * * * *